(12) United States Patent
Kiraly et al.

(10) Patent No.: US 7,292,711 B2
(45) Date of Patent: Nov. 6, 2007

(54) FLIGHT PARAMETER MEASUREMENT SYSTEM

(75) Inventors: Christopher M. Kiraly, San Diego, CA (US); George Victor Wintriss, San Diego, CA (US)

(73) Assignee: Wintriss Engineering Corporation, San Diego, CA (US)

( * ) Notice: Subject to any disclaimer, the term of this patent is extended or adjusted under 35 U.S.C. 154(b) by 680 days.

(21) Appl. No.: 10/911,009

(22) Filed: Aug. 3, 2004

(65) Prior Publication Data

US 2006/0008116 A1    Jan. 12, 2006

Related U.S. Application Data

(63) Continuation-in-part of application No. 10/456,054, filed on Jun. 6, 2003.

(60) Provisional application No. 60/493,999, filed on Aug. 8, 2003, provisional application No. 60/419,389, filed on Oct. 17, 2002, provisional application No. 60/389,338, filed on Jun. 13, 2002, provisional application No. 60/387,556, filed on Jun. 6, 2002.

(51) Int. Cl.
*G06K 9/00* (2006.01)
*G06K 9/36* (2006.01)
*H04N 5/225* (2006.01)

(52) U.S. Cl. ............... 382/103; 382/154; 382/181; 382/285; 348/169

(58) Field of Classification Search ............ None
See application file for complete search history.

(56) References Cited

U.S. PATENT DOCUMENTS

| | | | | |
|---|---|---|---|---|
| 5,335,032 | A | * | 8/1994 | Onuki et al. ............ 396/50 |
| 6,520,864 | B1 | * | 2/2003 | Wilk ................... 473/152 |
| 6,592,465 | B2 | * | 7/2003 | Lutz et al. ............. 473/198 |
| 7,209,576 | B2 | * | 4/2007 | Rankin ................. 382/107 |

* cited by examiner

*Primary Examiner*—Bhavesh M Mehta
*Assistant Examiner*—Charles Kim
(74) *Attorney, Agent, or Firm*—Manuel F. de la Cerra

(57) ABSTRACT

A portable flight parameter measurement tracks the surface of an object in motion, e.g., a ball, and determines speed, trajectory, a spin axis, and a spin rate around that axis. The measurement system is particularly suited for analyzing the path of a ball in flight which is affected, in great part, by the amount of spin and the direction of spin imparted to the ball upon impact. The measurement system provides a user, such as a golfer, with important feedback for modifying his or her swing to obtain desired results. The measurement system utilizes non-precision marks, surface blemishes such as cuts made by a club, dimples, or a combination of all three as the only features necessary to determine ball flight characteristics.

5 Claims, 6 Drawing Sheets

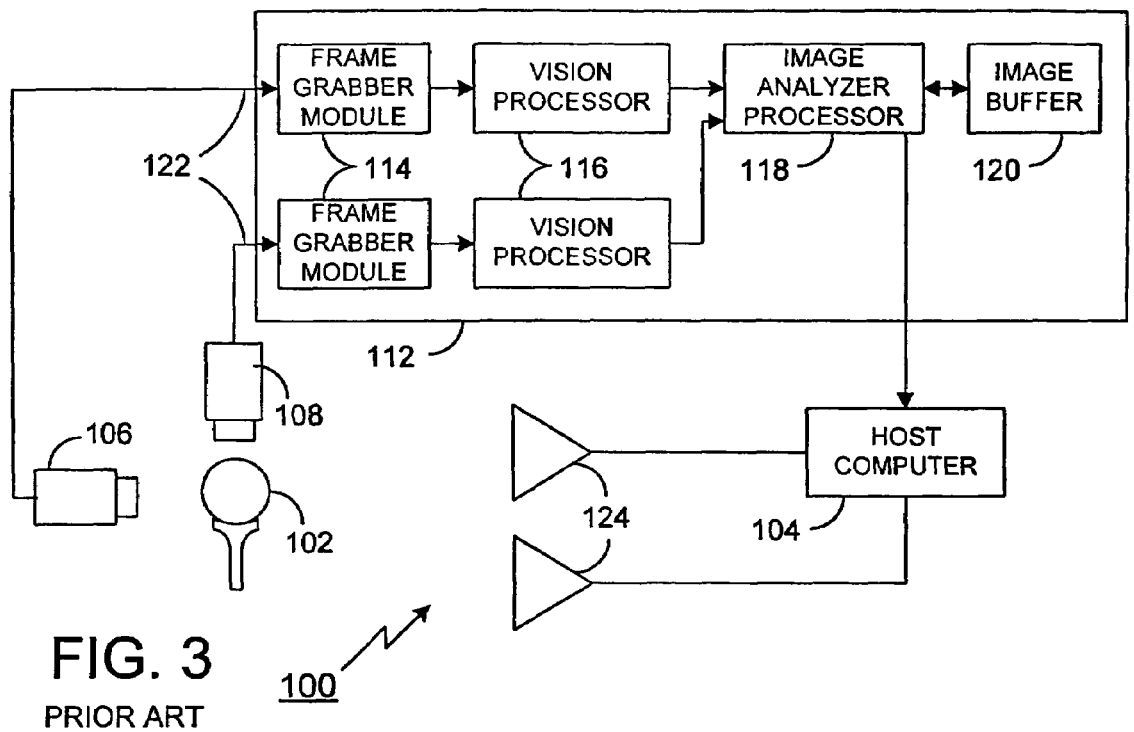
FIG. 3
PRIOR ART
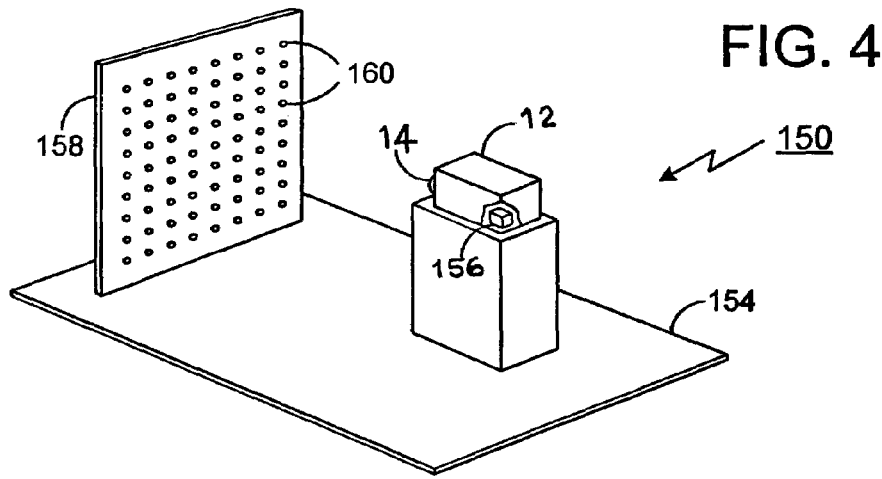
FIG. 4
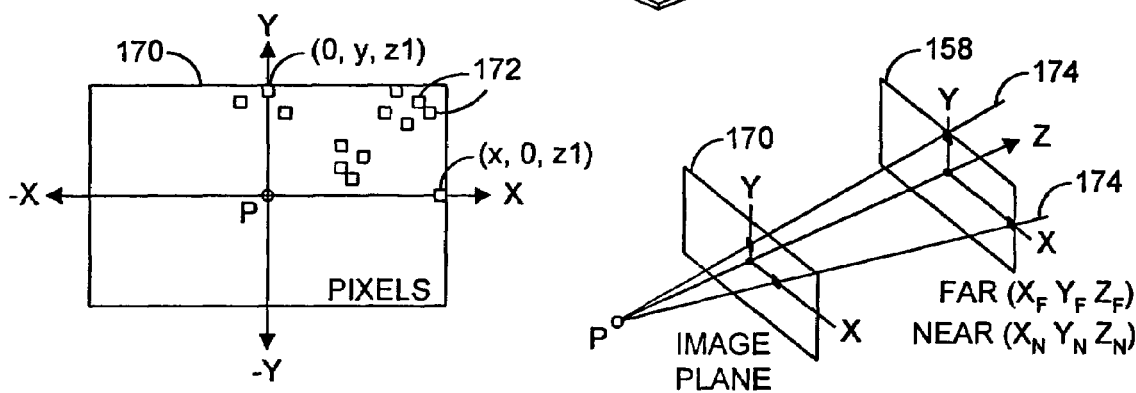
FIG. 5
FIG. 6

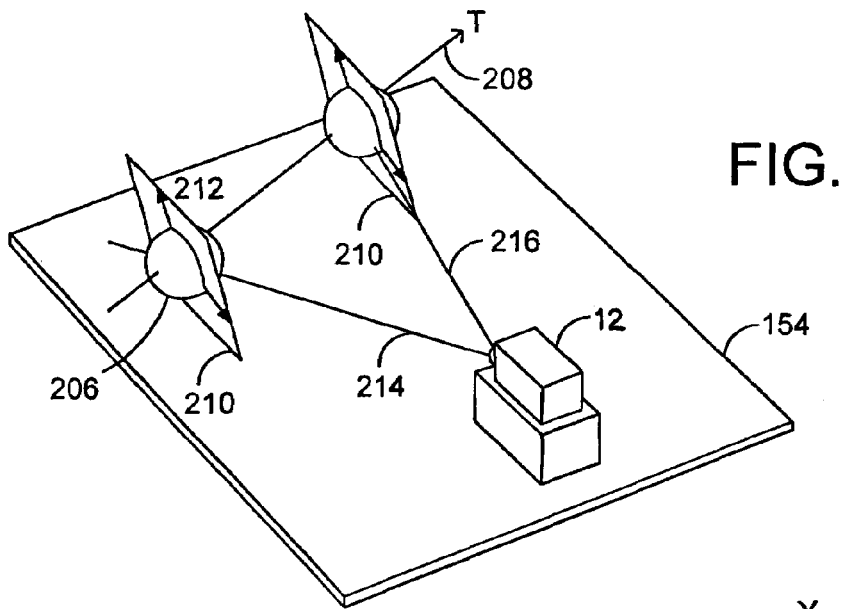
FIG. 10
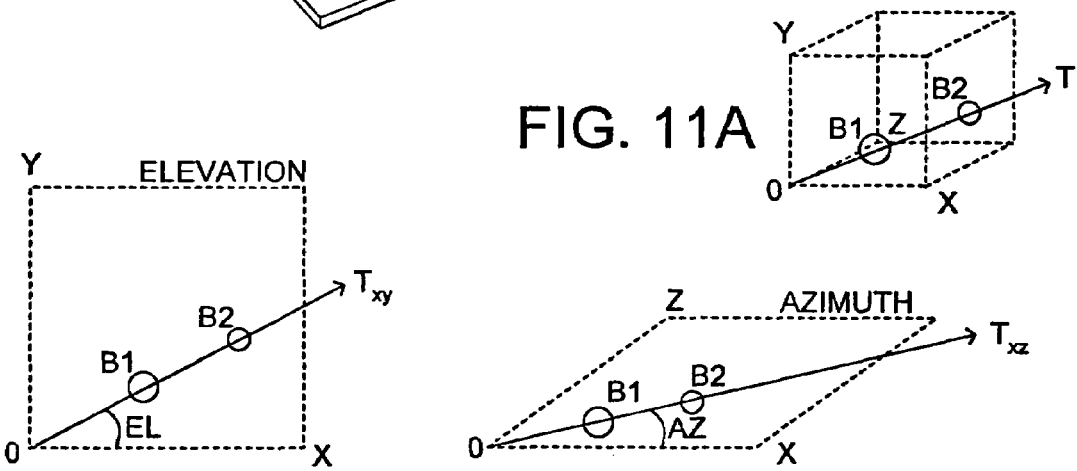
FIG. 11A
FIG. 11B
FIG. 11C
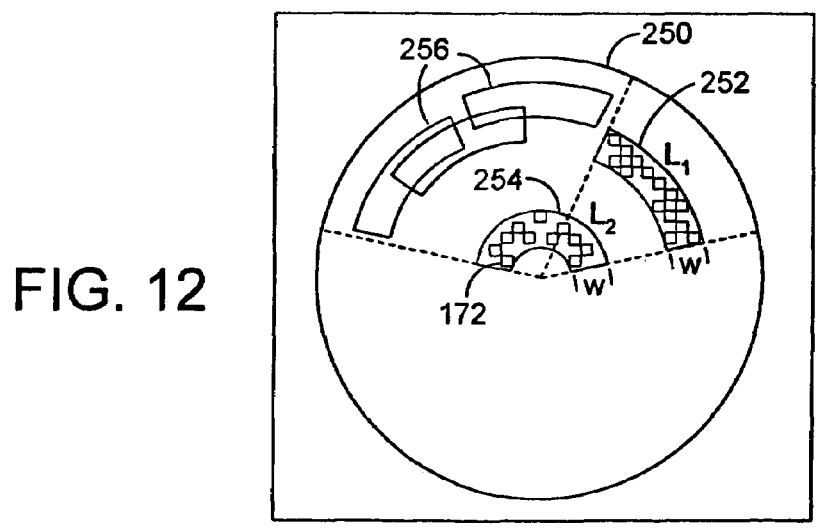
FIG. 12

FIG. 13
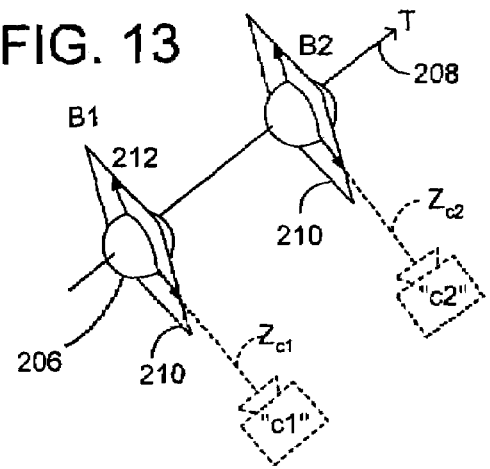
FIG. 14A  FIG. 14B
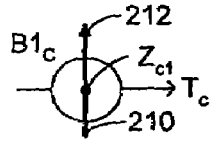 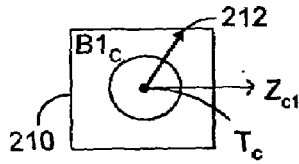
FIG. 15A  FIG. 15B
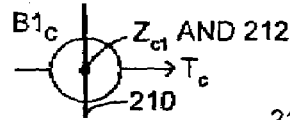 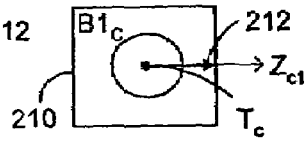
FIG. 16A  FIG. 16B
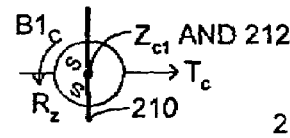 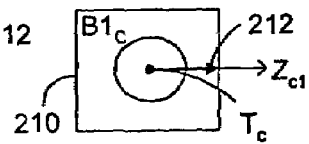
FIG. 17A  FIG. 17B
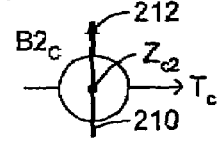 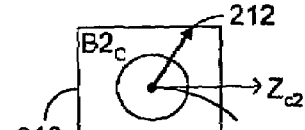
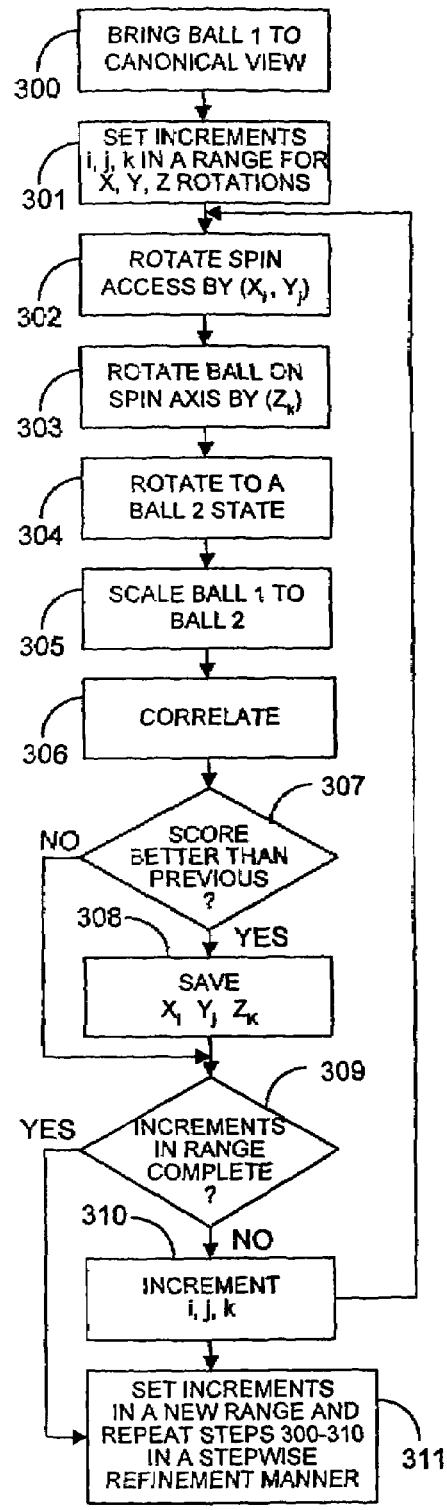
FIG. 18

FLIGHT PARAMETER MEASUREMENT SYSTEM

CROSS-REFERENCES TO RELATED APPLICATIONS

This application is a Continuation-In-Part of application Ser. No. 10/456,054 filed Jun. 6, 2003 for a "Flight Parameter Measurement System", which claims the benefit of priority under 35 U.S.C. 119(e) to U.S. Provisional Patent Application No. 60/387,556, filed Jun. 6, 2002, entitled "Method for Alignment of a Golf Ball Flight Monitoring Apparatus"; 60/389,338, filed Jun. 13, 2002, entitled "Method for Initiation of Measurement in a Golf Ball Flight Monitoring Apparatus"; and 60/419,389, filed Oct. 17, 2002, entitled "Golf Ball Flight Parameter Measurement System", which are incorporated herein by reference. This application also claims the benefit of priority under 35 U.S.C. 119(e) to U.S. Provisional Patent Application No. 60/493,999 filed Aug. 8, 2003 for a "User Interface for a Flight Parameter Measurement System", which application is also incorporated herein by reference.

FIELD OF INVENTION

The present invention relates generally to flight parameter measurement systems, and more specifically to a camera measurement system for determining the paths of objects in flight.

BACKGROUND OF THE INVENTION

The path of a golf ball is determined by the launch conditions measured over the first few feet of flight after the golf ball is struck by a golf club. The parameters that are used to determine the path of a golf ball are spin, launch elevation, launch azimuth and speed. Knowing the precise values of ball spin provides the golfer with important feedback for modifying his or her swing to obtain desired golf game results.

Continuing with the golf ball example, devices that provide immediate feedback of the initial spin conditions of a golf ball may be utilized by the golfer and the golf shop professional for training purposes as well as for fitting a set of golf clubs to the golfer. Such devices may also be used to test the effectiveness of golf club and golf ball design modifications by measuring the effects of the design modifications on the golf ball launch parameters. By analyzing these effects, design modifications can be evaluated and improved. Other applications of these devices include golf simulators which project the flight of the ball in a video presentation based on initial golf ball launch conditions. The aforementioned prior art devices require complex camera systems for calibration/alignment, spin measurement, triggering, image capture, and trajectory measurement which are too expensive and difficult to use for the typical golfer and golf shop professional.

Calibration/Alignment. Accurate measurement of golf ball flight parameters requires measurements of the initial conditions of a golf ball before impact. Prior art systems use complex targets in the field or other optical devices to calibrate cameras. These devices are cumbersome, fragile and also must be calibrated at regular intervals. Typically, positioning the target into the field of view of a camera or cameras and obtaining the correct lighting conditions and proper focusing requires skills that exceed the capabilities of the average golfer, user, and/or professional.

There are various methods for field-calibrating the camera or cameras that are commonly used in prior art systems. A first method utilizes a target with dots which is set up where the ball will be struck. The camera finds the center of each of the dots to determine a frame of reference. The target is removed and the player hits a shot. The camera then uses the frame of reference to determine how the ball is moving. This method gives very crude measurement results since the number of calibration points are too far apart to properly account for lens distortion, and the target is placed manually so that the precise location of the dots cannot be determined.

A more sophisticated method is to have a target with precise reference markers, known as "fiducials", such as squares or circles, with known geometry. Software of the prior art system determines the edges or centers of each of the marks, and creates a mathematical model of the camera and lens, taking into account the distortion caused by the camera and lens system. The target is imaged at two known positions to provide a set of calibration points in three dimensions.

Prior art systems also require special precision optical alignment targets that are necessary in order to locate a reference plane in space which is used for all azimuth and elevation measurements. The precision alignment targets must be imaged by the system cameras prior to each system setup. These complex alignment procedures, which require bulky and easily lost alignment targets, are difficult for lay personnel to learn, to set up and to move from place to place. In addition, the prior art alignment procedures usually require special lighting and focusing procedures for the alignment targets. Thus, the need for specialized alignment equipment, with the inherent costs and bulk, render the prior art systems inaccessible for general use, e.g., use by the public.

Spin Measurement. There are a variety of prior art systems that measure the initial spin conditions of a golf ball. A typical system uses strategically placed retroreflective or non-retroreflective dots, equatorial striping, or other specific marks on the ball that must be aligned to face the camera of the imaging system. The markings must be applied with precision, and are subject to obliteration or loss with repeated usage of the marked golf ball. The position of the dots/markings relative to a known position on the ball or relative to other dots/markings plays a central role in the precision of the measurement of the golf ball flight parameter measurements. Thus, applying these markings to the golf ball may require the use of special, costly equipment. In addition, specially marked balls preclude the ad hoc usage of a golfer's own golf balls, and require purchase of the marked balls from specialized manufacturers.

Triggering. Prior art systems for flight parameter measurement also require a separate triggering mechanisms for determining when the camera(s) should commence recording sequences of a golf ball or golf club movement, and when the measurement equipment should begin measurements. The triggering mechanisms typically involve acoustic or photo detectors which detect the moment of impact of the golf ball by the golf club. These mechanisms have significant limitations. The acoustic triggering device uses a microphone to detect the sound of the impact of a golf club on a ball. Other triggering devices employed by the prior art systems are based upon optical sensor technology for detecting an event, for example, when a golf club swings through an optical plane, e.g., a laser.

In addition to the disadvantage of requiring an additional piece of equipment for triggering, the prior art triggering devices are problematic and present disadvantages that render these devices impractical for the average golfer. For example, acoustic pickups often miss the trigger event or misfire upon receiving extraneous sounds. Trigger sensors often will not function properly when a golf ball is struck from natural, living turf. Remote photo/optical trigger sensors often require alignment and special overhead lighting since photo triggering devices typically will not function properly in an outdoor or sunlight environment. Also, laser-based sensors have a fixed, limited field of view. Trigger sensors which are remote from the measurement apparatus are easily lost or damaged, and require mounting in special ground level assemblies. In addition, precise golf ball placement is required for photo sensor or laser based triggering devices. A further disadvantage of both acoustic and optical sensors is that these sensors must be calibrated, and thus, require yet additional calibration devices.

Image Capture. Prior art cameras use the technique of multiple exposures to track the flight of the ball. The lenses are opened, and a flash strobe is used to create multiple exposures of the ball. However, this technique renders accurate analysis of ball motion difficult since multiple images are superimposed on top of each other. The multiple exposure technique will also capture multiple images of stationary background objects in the field of view that build up in intensity or bloom, potentially obscuring the images of the ball in flight. As a result, the camera must be placed in a location where the background is neutral to create the required contrast with the ball when illuminated.

Trajectory Measurement with a Single Camera. Prior art single camera systems measure spin and launch angle in a plane that is orthogonal to the field of view (FOV) of the camera. Speed, spin and launch angle are calculated in two dimensions introducing significant errors into the measured flight characteristics. Additionally, such a system can not measure azimuth.

Prior Art Example. Prior art measurement systems as discussed above may be single or multiple camera systems. FIG. 3 illustrates a typical dual-camera measurement system 100 of the prior art. The measurement system 100 uses two area cameras 106, 108 that are positioned at two angles to a target position 102, such as a golf ball and tee. Typically, two types of sensor technologies, charge coupled device (CCD) or complementary metal oxide semiconductor (CMOS), are used in the cameras 106, 108. CMOS sensor technology allows some processing electronics to be included on the same chip as the sensor within the camera 106, 108. High bandwidth camera-specific data cables 122 are required to transfer data from the area cameras 106, 108 to a vision processor 112. A typical high bandwidth data stream transfer is forty (40) million pixels per seconds, i.e., 320 Mbits per second for pixels of eight (8) bits. The mega-pixel data stream is transferred over the camera-specific cables 122 to frame grabber modules 114 in the vision processor 112. Frame grabber modules 114 utilize standard integrated circuit (IC) boards to digitize an analog video stream image from the cameras 106, 108.

Continuing with FIG. 3, the digitized images, represented by arrays of numbers, are streamed to pipeline vision processors 116 for preprocessing. The pipeline vision processors 116 utilize dedicated image processing boards for data and image analysis. For example, a pipeline vision processor 116 may be configured to extract specific information from an image. The processed images from each of the pipeline vision processors 116 are sent to an image analyzer processor 118 that further analyzes and processes multiple images of a golf ball 102. The golf ball parameter measuring system 100 of the prior art may further include an image buffer board 120 for data storage. The vision processor 112 of the prior art requires a chassis to house the IC boards of the frame grabber module 114, the pipeline vision processor 116, the image analyzer processor 118 and the image buffer 120. The processed image from the vision processor 116 is sent to a host computer 104 for display on the graphical user interface (GUI) of the host computer 104. The host computer 104 may also include a database for the storage of golf ball characteristics which can be correlated with a particular golf club which was utilized to launch the golf ball.

The golf ball flight parameter measuring systems 100 of the prior art present several disadvantages. As described above, prior art golf ball flight parameter measuring systems 100 require special markings on the golf balls. At least two cameras 106, 108 must be used to achieve precision flight parameters, as well as special optical alignment equipment and triggering equipment 124 to align the cameras and initiate the measurement system after a ball is struck. Thus, there exists a need for a device and method for measuring the in-flight characteristics of a golf ball which provides precision measurements utilizing unmodified golf balls, a single camera for easy set-up and operation, and which does not require cumbersome and error-prone alignment and triggering equipment.

SUMMARY OF THE INVENTION

It is an object of the present invention to provide a flight parameter measurement system for measurement of characteristics of an object in flight, such as a golf ball, that utilizes a single camera to capture all the information necessary to establish the in-flight characteristics of the object in three dimensions.

It is a further object of the present invention to provide a system that measures golf ball flight characteristics using a golf ball without specialized markings.

Another object of the present invention is to provide a flight parameter measurement system that is calibrated in the factory and easy to set up and align in the field.

Still another object of the present invention is to provide a golf ball flight parameter measurement system that will also image the golf club prior to impact with the ball and provide golf club angle information.

In an exemplary embodiment of the present invention, a single, stand alone camera is utilized to capture images of an object in flight. The system calculates a trajectory, an azimuth, an elevation, a spin axis, and a speed of rotation of the object in flight from the captured images and known characteristics of the camera. The measurement system does not require any special markings on the object or ball to determine the spin rate and the spin axis. Instead, the measurement system of the exemplary embodiment uses non-precision marks, surface blemishes such as cuts made by the club, dimples, or a combination of all three as the only features necessary to determine ball flight characteristics. The camera is triggered to start a measurement sequence based on input from a triggering system having an audio sensor and a radar sensor to detect the sound of a ball being struck, along with motion of the ball.

According to another aspect of the present invention, a measurement system for determining at least one characteristic of an object in motion is provided, which comprises a camera having a lens for capturing a plurality of images, a memory device connected to the camera for storing the plurality of images, a triggering means for commencing image capture by the camera, a processor coupled to the memory device, triggering means and camera, the processor being programmed to find the object in motion in a plurality of images, calculate three dimensional coordinates for each of the plurality of images, rotate a reference image of the plurality of images by a set of rotations of a plurality of rotation sets, scale the rotated reference image to a target image of the plurality of images, correlate the rotated reference image to the target image to obtain a score, and utilize a best rotation set of the plurality of rotation sets to determine at least one characteristic of the object in motion, and an audio data output device connected to the processor for audio output of the determined characteristic to the user.

In an exemplary embodiment of the invention, the processor provides output information to a display such as a digital display that is visible to a golfer, for example, and displays the golf club head face angle, golf ball launch elevation, azimuth, and spin. The system may also include wireless transceiver circuitry for communicating with a remote device.

The stand alone camera or system of the exemplary embodiment of this invention also includes an optical area sensor, an analog to digital converter (ADC), a field programmable gate array (FPGA), an alignment device, and output circuitry sufficient to drive the display, as well as a light source such as a strobe light for illuminating the object in flight at the start of its flight path. The system may be calibrated during the manufacturing process, and uses the alignment device to determine alignment correction factors in the field.

According to another aspect of the present invention, a method of measuring flight parameters of an object in flight is provided, which comprises the steps of:

calibrating a camera lens to establish x,y,z directions for every x,y pixel in an image plane of a camera;
determining alignment correction factors;
triggering the camera to capture images of an object in motion based on input from radar and audio input sensors directed at a ball origination location;
after the camera has been triggered, capturing a plurality of images of an object in motion;
finding the object in each of the plurality of images;
calculating three dimensional coordinates for each of the plurality of images;
calculating a velocity vector for the object from the three dimensional coordinates;
rotating a reference image of the plurality of images by a first set of rotations of a plurality of rotation sets;
scaling the rotated reference image to a target image;
correlating the reference image to the target image to obtain an incremental score of a plurality of scores;
repeating the steps of rotating, scaling and correlating in a stepwise refinement manner to obtain a best score of a plurality of scores; and
utilizing a best rotation set of the plurality of rotation sets to determine the parameters of the object in motion.

The method may also comprise the step of providing the determined parameters as an output to an output device such as a digital display and/or an audio output device. In order to establish the three dimensional coordinates of the object, which may be a spherical object such as a ball, the camera processor locates the positions of the ball in each captured image and identifies the center and the diameter of the ball. The position, center, and diameter are then used to calculate the three dimensional coordinates and velocity vector of the ball. A glint removal process may be performed on each ball image to remove "hot" spots in the image by averages of nearby pixels. Lighting normalization may then be performed on each image to remove visual artifacts from the image. Images are repeatedly rotated, scaled and correlated to other images to determine the spin axis, spin rate, trajectory and speed of the ball.

The flight parameter measurement system of this invention has a camera with fixed focus and automatic exposure adjustment, and does not require manual adjustment of the focus or exposure, nor any calibration on site, since all calibration is carried out in the factory. It allows an object such as a ball to be tracked without requiring any special markings to be made on the ball. All the system components can be provided in one portable enclosure, requiring no separate computer, mouse, keyboard or monitor. This makes it very easy to use in locations such as golf courses. The use of both audio and radar sensing to trigger a measurement sequence will eliminate many false triggers of the system due to extraneous noise and the like.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 3 is a block diagram of a typical prior art golf ball flight analysis system;

FIG. 4 is a diagram of a calibration/alignment method of the exemplary embodiment;

FIG. 5 is a diagram of a camera field of view which maps a real world three dimensional image into two dimensions;

FIG. 6 is an illustration of a method for determining a line of sight for each pixel of the camera field of view as shown in FIG. 5;

FIG. 10 illustrates a flight parameter measurement system of the exemplary embodiment imaging a ball in flight;

FIG. 11A is an illustration of a three dimensional trajectory path of a ball showing the ball at a first position B1 and the ball at a second position B2;

FIG. 11B illustrates the elevation angle in the XY plane of the trajectory of the ball of FIG. 11A;

FIG. 11C illustrates the azimuth angle in the XZ plane of the trajectory of the ball of FIG. 11A;

FIG. 12 illustrates a method of the exemplary embodiment for normalizing the pixels of an image of a ball;

FIG. 13 illustrates a method for establishing canonical images of the balls;

FIG. 14A illustrates front view aligned parallel to a Z axis of a hypothetical camera C1 that has been positioned to capture a canonical image B1 of a ball;

FIG. 14B illustrates a side view of the image of FIG. 14A wherein the spin axis is in a plane perpendicular to the trajectory;

FIG. 15A illustrates a rotation of the spin axis to correspond with the Z axis of the hypothetical camera;

FIG. 15B illustrates a side view of the image of FIG. 15A wherein the Z axis and the spin axis are the same;

FIG. 16A illustrates the rotation of the ball B1 about the spin axis;

FIG. 16B illustrates a side view of the image of FIG. 16A;

FIG. 17A illustrates a front view aligned parallel to a Z axis of a hypothetical camera C2 that has been positioned to capture a hypothetical image B2 of a ball;

FIG. 17B illustrates a side view of the image of FIG. 17A wherein the spin axis is in a plane perpendicular to the trajectory; and FIG. 18 is a flow diagram of the steps of an exemplary method for rotating, scaling and correlating images of a ball.

DETAILED DESCRIPTION OF THE DRAWINGS

The following detailed description utilizes a number of acronyms which are generally well known in the art. While definitions are typically provided with the first instance of each acronym, for convenience, Table 1 below provides a list of the acronyms and abbreviations and their respective definitions.

TABLE 1

| ACRONYM | DEFINITION |
| --- | --- |
| ADC | Analog to Digital Converter |
| IC | Integrated Circuit |
| CCD | Charged Couple Device |
| CMOS | Complementary Metal Oxide Semiconductor |
| FOV | Field of View |
| FPGA | Field Programmable Gate Array |
| GUI | Graphical User Interface |
| LOS | Line of Sight |

The exemplary embodiment of the flight parameter measurement system of this invention tracks the surface of an object in motion, e.g., a ball, and determines speed, direction and flight path, a spin axis, and spin rate around that axis. The measurement system does not require any special markings on the ball to determine the spin rate and the spin axis. Instead, the measurement system of the exemplary embodiment utilizes non-precision marks, surface blemishes such as cuts made by a club, dimples, or a combination of all three as the only features necessary to determine ball flight characteristics. The use of the measurement system of the exemplary embodiment may be extended for all types of balls being set in motion or in motion, including baseballs and tennis balls, although it is described below in connection with measuring golf ball flight parameters. In addition, the measurement system may be used for determining flight parameters of other non-spherical objects establishing characteristics, i.e., rules and assumptions, of a specific class of objects.

Figure 1:
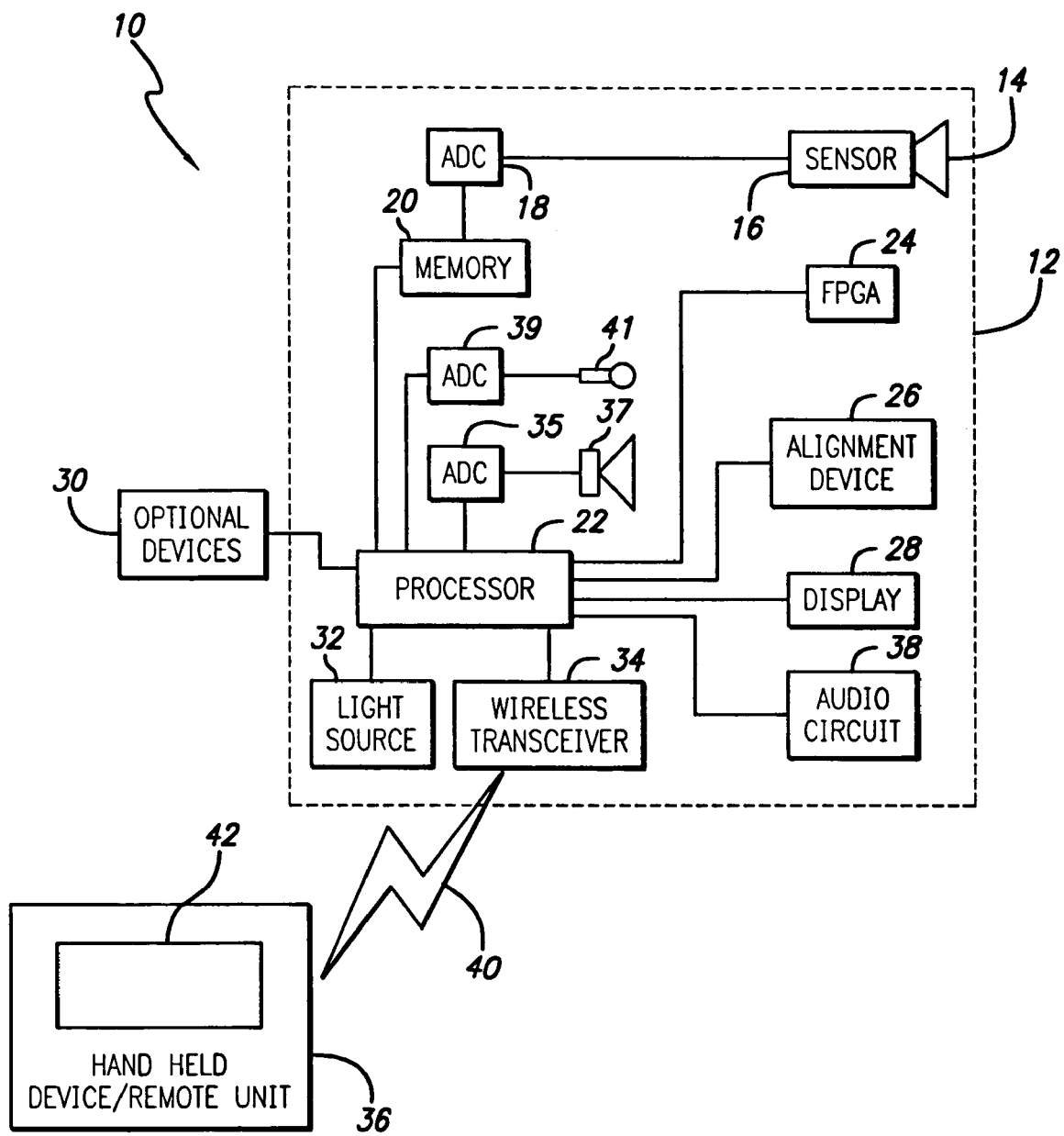
FIG. 1 is block diagram of a stand alone flight parameter measurement system according to a first embodiment of the present invention.

A flight parameter measurement system 10 according to an exemplary embodiment of the present invention is illustrated in FIG. 1, while FIG. 2 and FIGS. 4 to 18 illustrate details of the set up and programming of the system to monitor, measure, calculate, and provide output of golf ball flight parameters. The system as illustrated in FIG. 1 basically comprises a number of components assembled together in a single portable outer enclosure or camera housing 12. The system within enclosure 12 includes a camera lens 14 associated with an optical area sensor 16 and a processor 22 connected to the camera via a large digital memory 20 and an analog to digital converter (ADC) 18. Also associated with the processor 22 is a field programmable gate array (FPGA) 24, an alignment device 26, and a digital display 28 along with output circuitry sufficient to drive the display. In an alternative embodiment, the display may be attached to the camera as a peripheral device. The system is capable of storing a plurality of images in digital memory and subsequently analyzing those images to determine golf club head and golf ball motion characteristics as discussed below.

The system 10 also includes an audio circuit 38 with a speaker(s) coupled to the processor 22 within housing 12. The audio circuit 28 outputs the flight parameter results via, for example, a digital voice in a variety of languages, or through tones or any other sounds. The audio circuit 38 also may be utilized to instruct the user in the operation of the system 12, in adjusting his or her swing, etc. The audio circuit 38 facilitates the golfer by "calling out" the results, and he or she does not have to move out of position to view the results on a visual display. Similarly, a golf professional, such as a golf club fitter, who is assisting a golfer with selecting a new set of clubs, does not have to leave the immediate area to check on swing results on a remote monitor as is necessary in prior art systems.

The audio circuit 38 of the exemplary embodiment may optionally include a microphone for receiving voice commands from the user. For example, a golfer may request a repeat of specific information about the impact results of the most recent swing, or may request stored results from prior practice sessions. The golfer may request information about how to use the system, which information is stored in the processor 22. The processor may also contain information about a golf course, distances from tees to flags, and the like.

System 10 also includes sensors for use in triggering the camera to start collecting images, as will be described in more detail below. A radar horn 37 within housing 12 is directed in the same direction as camera lens 14 and is connected to processor 22 via ADC 35. A microphone 41 also directed in the same direction as lens 14 is connected via ADC 39 to the processor 22.

A pulsed illumination source or strobe light 32 is used to generate digitized images of a plurality of time-sequential images of a golf ball and/or a golf club head in motion. As shown in FIG. 1, the system also includes a wireless transceiver 34 for communicating with a hand held or other remote device 36 by means of wireless communication 40, e.g., any type of electromagnetic radiation source such as Infrared, radio frequency, and light waves. Wireless communication specifications utilized by the system 100 may include, for example, communication via a wireless local area network such as wireless fidelity "WI-FI" which utilizes the IEEE 802.11 specification, or Bluetooth™, for linking mobile computers, mobile phones, etc. The housing 12 includes input/output ports for connecting optional devices 30 to processor 22. Such devices may include host computers, solar cells, and the like.

Continuing with FIG. 1, the remote device 36 may be any type of portable computer, such as a personal digital assistant, a laptop, or the like, which can communicate utilizing a wireless specification over the wireless communication channel 40. The device 36 may include a display 42 and a speaker to relay results and other information, as discussed above, to the user. The device 36 may be utilized to store a user's practice history to track improvements. This feature may be particularly useful for situations in which the system 10 is used by multiple golfers such that storing all measurement results in memory 20 is not practical.

Figure 2:
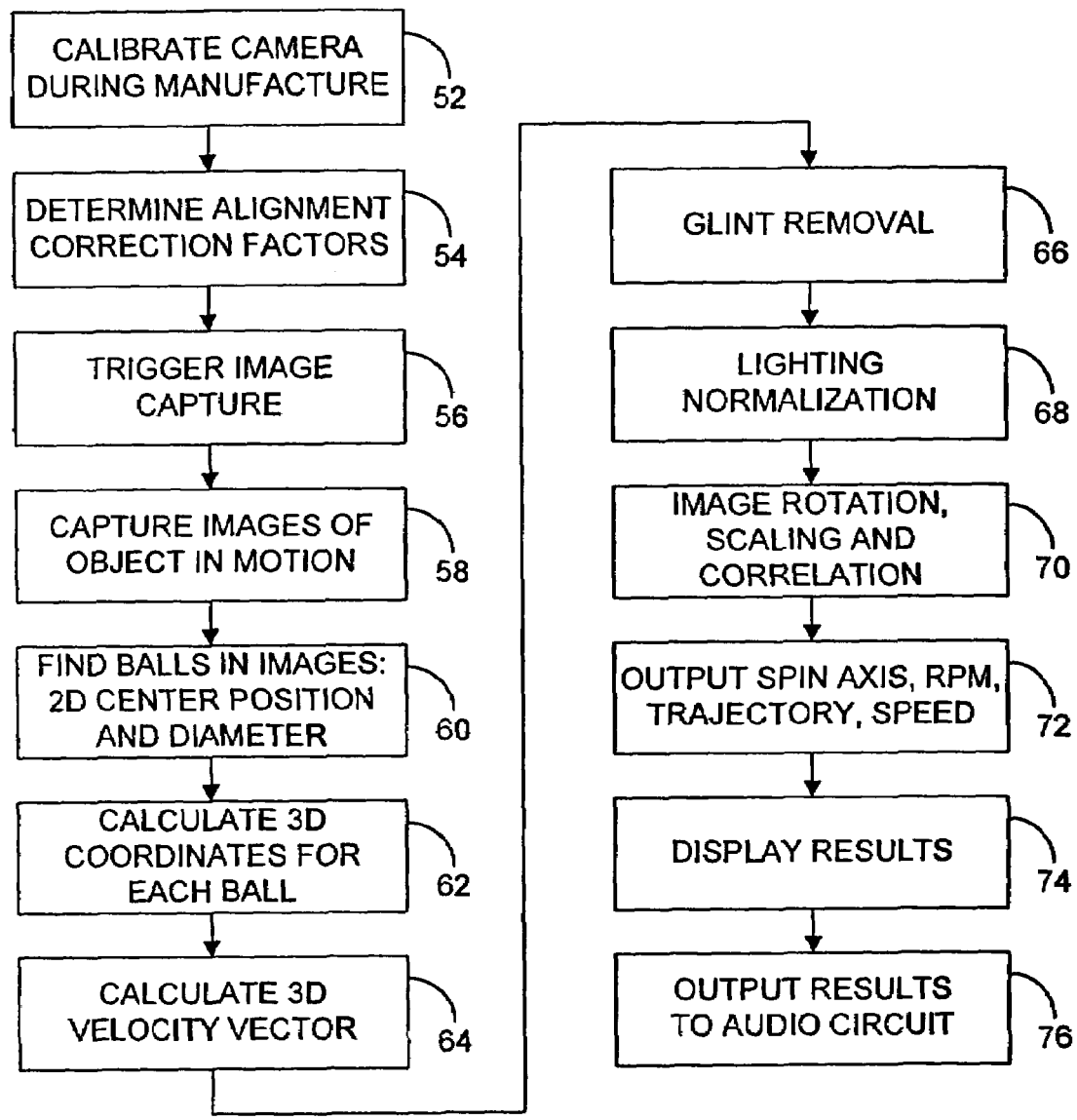
FIG. 2 is a flow diagram of the method of determining flight parameters of a ball in motion in the exemplary embodiment.

The measurement system 10 has a number of subsystems and associated methods/procedures for measuring flight parameters. FIG. 2 illustrates an exemplary method 50 of determining flight parameter measurements of a ball. Each step of the preferred method 50 is explained in detail below. Referring to FIG. 1 and FIG. 2, the system 10 is calibrated 52 during the manufacturing process. The system 10 utilizes an alignment device 26 to determine alignment correction factors 54 in the field. The system 10 of the exemplary embodiment also includes a process for triggering image capture 56, using inputs from radar horn 37 and microphone 41. After triggering, a series of images of a ball in flight are captured 58 and stored in the camera memory 20. The camera processor 22 locates the positions of the ball in each captured image 60 and identifies its center and diameter. The position, center and diameter are utilized by the camera 10 to calculate three dimensional coordinates for each ball 62 and a velocity vector 64.

Continuing with FIG. 2, a glint removal process 66 is performed on each ball image to remove "hot" spots in the image by averages of nearby pixels. Lighting normalization 68 is then performed on the ball image to remove visual artifacts from the image. Images are rotated, scaled, and correlated to a subsequent image 70 to provide the results of the spin axis, spin rate, trajectory and speed of the ball (step 72). In step 74, these results are displayed to the user on the camera display 28 or on a peripheral display 30, 36, and/or the results are relayed to the user through an audio circuit 38 in step 76, as shown in FIG. 1.

1. Calibration of the Camera

The exemplary embodiment of the present invention eliminates the need for alignment equipment and calibration procedures, and provides a ball tracking and measurement apparatus which a non-skilled person can set up in the field, e.g., at a golf driving range or in a golf shop. In the exemplary embodiment, the measurement system 10 is accurately calibrated in the factory, i.e., during manufacturing. Calibration of the camera establishes the (X,Y,Z) directions for every (X,Y) pixel in the image plane, as discussed further below.

FIG. 4 is an illustration of a calibration and alignment system and process 150 for the flight parameter measurement system 100 of the exemplary embodiment. The housing 12 is placed on an earth tangential table aligned parallel to plane 154. The camera 12 images a reference target 158 in two positions to create a model of the camera lens 14, and to compute a true world coordinate reference, i.e., spatial coordinates that are relative to the target, and thus to earth tangential. Using the precision marks 160 on the target 158, given a known distance from the camera lens 14 to the target 158, and given an orientation of the target 158 to a plane 154, the measurement system calculates a vector for every pixel of the field of view of the camera lens 14. When an object is imaged in the camera field of view, the position of that object is known in two dimensions since each pixel of the image has a known position in two dimensions.

FIG. 5 illustrates a field of view 170 of the camera lens. Every pixel 172 is assigned an X and Y coordinate where z1 is the distance from the camera lens 14 to a target 158. A pinhole perspective of the calibration process is shown in FIG. 6, where the pinhole P corresponds to the focal point of the camera lens 14. The camera lens 14 images a target 158 on an image plane 170 with the target 158 placed at a first "near" position at a distance $Z_N$ from the target. Each pixel of the image of the target is defined by a coordinate, $X_N$, $Y_N$. The target 158 is moved to a second "far" position at a distance $Z_F$ from the target, such that each pixel of the image of the target is defined by a coordinate $X_F$, $Y_F$. Thus, each pixel 172 is associated with two world positions. The coordinates $X_N$, $Y_N$ and $X_F$, $Y_F$ are utilized to establish a reference line of sight (LOS) 174 for each pixel in the image. In the exemplary embodiment of the invention, the system 100 verifies that the line of sight for each pixel converges at pinhole P.

2. Alignment of the Camera

Referring again to FIG. 4, some of the measurements necessary in the analysis of golf ball launch parameters are made relative to a plane 154 which is tangential to the earth's surface at the point of impact of a club with the golf ball. One part of the alignment process of the preferred embodiment is to accurately align the base of the camera housing 12, or optical measurement system, relative to such a plane 154. Measurements in the field may have to be adjusted by an offset if the orientation to earth is not level, e.g., the measurement system 152 is placed on an uneven surface.

During the calibration process illustrated in FIG. 4, the housing 12 is placed parallel to a planar surface 154. A two or three-axis accelerometer or inclinometer 156 (alignment device 26 of FIG. 1) is used in one possible method for aligning the base of camera or system housing 12 with the surface 154. The accelerometer or inclinometer 156 is capable of providing electrical signals to the processor 22 that indicate the extent of camera misalignment relative to the surface 154. These electrical signals are used to provide offset information for golf ball flight calculations such that perfect alignment of the golf ball imaging camera part of the system is not necessary. During calibration, the roll and pitch of the camera system 150 is measured and recorded using the accelerometer 156. When the unit is placed in on a surface by the user, e.g., the golfer, the accelerometer orientation measurements are taken and compared to measurements obtained during calibration. Any difference is utilized to compensate for the position of objects in images taken in the field.

An advantage of the calibration and alignment utilized by the present invention is that the flight measurement system 10 may be placed on an uneven surface, such as natural grass or dirt, and automatically align itself to the tangent plane of the earth. Another advantage of this method is that the flight measurement system 100 may be moved from place to place without requiring a manual realignment. For example, if a user is hitting a golf ball off natural turf, he may need to move to a new position from time to time as the turf is destroyed by repeated impacts from the golf club. Measurement and analysis may continue by simply by moving the housing 12 and placing it at the new location. The system 10 automatically calculates a new alignment using the camera/lens model created during manufacture without any intervention by the user. In addition, alignment allows for statistical results to be compared between many units in the field.

In an alternate embodiment, the flight parameter measurements are taken relative a launch platform, e.g., a practice tee platform. The measurement system 10 is calibrated with respect to the base of housing 12. This embodiment includes a switch mechanism allowing the user to turn off earth tangential and measure relative to the base of the unit.

Another embodiment of the flight parameter measurement system utilizes a two-dimensional bubble level (not shown) in the housing 12 to level the base of the camera with the earth's surface 154. The bubble level is adjusted by means of adjusting screws that rest on the earth's surface 154 and support the imaging camera housing 12. Alternatively, the bubble of the level is optically imaged, and an electrical signal derived from the offset image of the bubble relative to true level is produced and used in the flight parameter calculations.

Another method of alignment that may be utilized with the flight parameter measurement system is to align the system in the field by referencing two or three objects placed on the ground in the camera field of view. The objects on the ground are used to estimate the earth's tangential plane relative to the camera placement. The objects also may be used to calibrate azimuth. The objects are precisely located in three dimensions. A line is drawn between three points in space to generate a vector to give azimuth and the elevation reference. The processor 22 calculates an offset between the precision lab calibration values and the estimated tangent plane.

Another method for the alignment of the golf ball imaging camera system 10 with the earth's surface is to suspend the housing 12, pendulum-like, which allows the system to automatically find level due to the forces of gravity acting on the suspended housing or unit 12. Dampers of the suspension apparatus may be utilized to provide rapid stabilization of oscillations. Since the camera is level with respect to the earth's surface, the precision lab calibration values may be used for flight parameter calculations.

After the camera part of the system has been aligned with the earth's surface, additional azimuth alignment is necessary to accurately track a golf ball in flight. Azimuth alignment is obtained by sighting a distant object axially along an axis of the apparatus enclosure or housing 12 that has been pre-calibrated to the optical system during manufacture of the flight parameter measurement system. The sighted object is then used as a reference. This azimuth alignment may be accomplished by means of a laser pointer or a telescopic sighting device, or by direct viewing through a camera lens of a distant object.

In other embodiments of the invention, flight parameter measurement systems for the imaging of objects other than golf balls can be aligned utilizing the methods of this invention. Examples of objects which can be imaged in flight include, but are not limited to, firearm projectiles, baseballs, tennis balls, soccer balls, basket balls, hockey pucks and other sports devices.

3. Triggering of the Camera for Image Capture

Measurement and recording the position of a golf ball after impact by the golf club requires a precise initiation signal. In the exemplary embodiment of the invention, a precise initiation signal triggered by input of signals from the radar horn 37 and microphone 41 initiates a sequence of capturing of images by the camera, which are subsequently used to calculate various flight parameters, as described in more detail below. In prior art systems, image capture was often triggered by use of a microphone alone to detect the sound of a ball being struck by a golf club. However, this method caused false triggers due to extraneous noise or other golf balls being struck from different tees. This system uses both the microphone 41 and the radar horn 37 to trigger image capture. If the radar Doppler signal indicates movement at greater than a selected velocity (e.g. 20 mpH), and the microphone detects a sound such as would be produced by impact of a golf club with the ball, then the strobe light or light source 32 is switched on and image capture is started.

In an alternative embodiment of the invention, the need for special trigger devices to initiate tracking may be eliminated by utilizing the same camera for capturing images in real time. The flight parameter measurement system of the invention uses a high speed imaging camera to monitor launch conditions. In the alternative triggering system, images are captured continuously, and the captured images are used for both precise triggering of recording of images and for subsequent tracking of the flight of the ball. This alternative has the disadvantage that the light source must be on continuously, and may therefore burn out relatively quickly. However, it may be advantageous in some circumstances.

In the alternative triggering system, the camera which is monitoring the stationary golf ball, or an area proximate the launch position before/after impact, continuously acquires images and temporarily records images of the golf ball and its surrounding area. The camera acquires images sufficiently fast to detect the approach of a golf club or golf ball, such that the golf club or golf ball approach event may be utilized to set up trigger conditions which initiate the precision measurement and recording of the golf club during impact with the golf ball, and the subsequent golf ball motion. Through the use of fast image analysis techniques, certain portions of the acquired images are examined. Specific criteria which eliminate false triggering are utilized to initiate the acquisition of precision images.

In the alternative method for triggering image capture, a current image is subtracted, pixel by pixel, from the previous image. The image may be decimated to reduce processing requirements and/or increase signal to noise ratios. The resulting subtracted image is compared against a threshold to detect areas within the image for which motion has occurred. These areas of interest are analyzed further to look for the specific characteristics of a golf club or golf ball.

Figure 7:
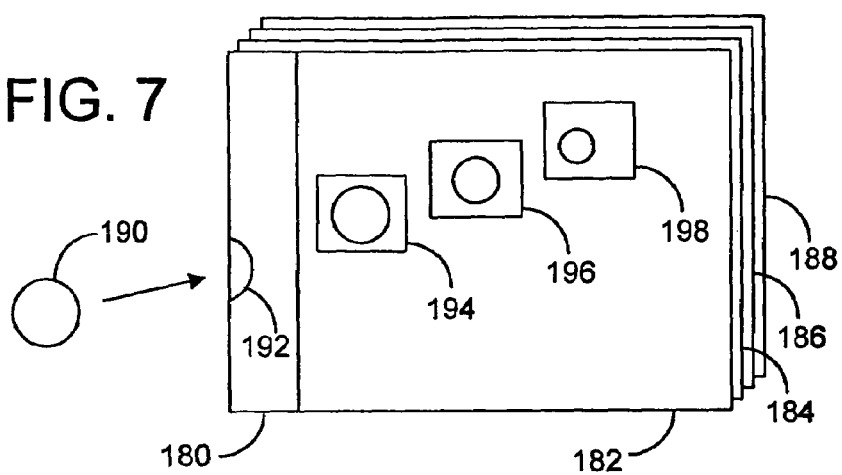
FIG. 7 illustrates camera window frames for triggering and image capture.

FIG. 7 illustrates the alternative method for triggering image capture. A "trigger" portion 180 of the camera window frame 182 is utilized for monitoring when the golf ball 190 or golf club moves or comes into view. Specifically, the camera of the present invention scans certain pixels at very high frame rates. This allows the inventive system to detect when an object 190 enters a pre-determined field of view 180. In the preferred embodiment, the pre-determined, or trigger, field of view 180 is a vertical field, i.e., perpendicular to the plane of the starting position of the ball that is on the left or right of the camera window 182 depending upon the placement of the camera with respect to the golf player. Once an object image 192 is detected in the trigger field of view 180, the object 192 is analyzed to verify its speed, shape and direction of motion. If these measurements exceed preset thresholds, a valid triggering event is declared and the image capturing process for tracking is initiated. The preset thresholds are used to eliminate false triggering events such as club waggle or movements of the golfer while addressing the ball.

In other embodiments of the invention, apparatus for the imaging of objects other than golf balls can be triggered utilizing the methods of this invention. Examples of objects which can be imaged in flight include, but are not limited to, firearm projectiles, baseballs, tennis balls, soccer balls, basketballs, hockey pucks and other sports devices. Area cameras or single-line-scan cameras can be utilized as the optical imaging devices.

4. Image Capture

The present invention captures independent images of the ball in flight using a high speed imaging camera with an associated object illuminating device such as a strobe light 32. As shown in FIG. 7, after triggering of image capture, the system is programmed to predict the position of the ball images based upon a calculated trajectory and speed of the ball. A starting or initial image 192 of the ball is taken in field of view 180. A window 194 that is a subset of the camera field of view 184 is defined that will capture an image of the ball at the next predicted position. Since this window 194 requires a small proportion of the pixels in the sensor, images are captured very rapidly, and the position of the window 196, 198 is adjusted as needed to match the extrapolated position of the next image ball. FIG. 7 shows the image windows 194, 196, 198 superimposed on a single field of view 180 to illustrate the movement of the ball in the images. However, each window 194, 196, 198 is from a separate image 184, 186, 188. The current frame as well as previous frames is continuously used to update the predicted position of the ball for the next image capture.

The exemplary embodiment of the invention also rapidly evaluates ambient light conditions in real time, and adjusts the camera exposure to optimize the image quality. For example, light conditions may vary from image to image outdoors due to shadows, clouds, etc. The exposure duration is adjusted so that the available light is distributed over the sensor's dynamic range. In addition, the duration of a flash strobe is adjusted to match the exposure time ensuring that adequate light is available to optimize image quality.

In alternate embodiments of the invention, the camera tracks the flight of the ball using the entire frame 184, 186, 188. This method is slower because it requires more processing to isolate the ball in the image. Therefore, fewer images of the ball are captured, and the tracking accuracy is reduced. Thus the described method of tracking, i.e., tracking changes in a tiny window which contains the ball image, is more efficient.

5. Finding the Balls in the Images

The exemplary embodiment of the flight parameter measurement system uses a single camera that takes two or more high-resolution images of the ball in flight and computes the true three dimensional (3D) flight characteristics. To compute the flight characteristics, the balls must be located in the images. To locate a ball in an image, the image is analyzed to identify the relatively bright area in the image. A bright area corresponding to a ball becomes dimmer towards the edges of the ball in a symmetrical manner. Thus, other bright spots that may be in the image are not mistaken for a ball. Obviously, the analysis used to locate an object in the image will vary depending upon the shape and other characteristics of the object.

Figure 8:
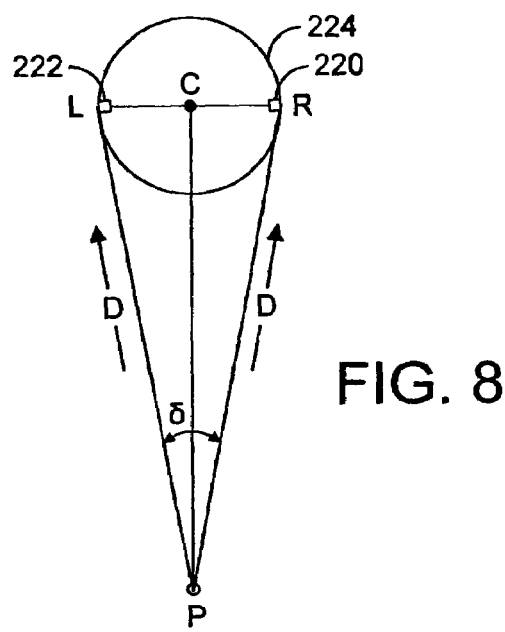
FIG. 8 illustrates an exemplary method for finding the distance from the camera to the ball.

Once the ball is located in the image, a leftmost pixel 222, as shown in FIG. 8, and a rightmost pixel 220 are located using sub-pixel techniques. The location of the center of the ball on the image plane is determined to be halfway between the leftmost and rightmost pixels 222, 220.

6. Calculating 3D Coordinates

FIG. 8 illustrates an exemplary method for finding the distance of a ball 224 in an image from the camera. Utilizing the calibration information, the system computes a 3D-world direction vector from the camera focal point P to the center C of each ball. As discussed above, the rightmost pixel 220 and leftmost pixel 22 of the grayscale image are located using sub-pixel techniques to determine the diameter of the ball, given by the vector LR. Since balls are manufactured to exacting dimension and are generally 1.68 inches in diameter, the, distance D to the ball is calculated using the calibration model for the camera. Specifically, vector PL represents the line of sight to the leftmost pixel 222, and vector PR represents the line of sight to the rightmost pixel 220. The distance of the ball from the camera in comparison to the diameter of the ball is such that the vectors PL and PR are effectively tangential to the ball 224 at the leftmost and rightmost pixels 222, 220. Since the angle δ between the right and left line of sights are known, and the standard diameter of a ball is known, the distance D is calculated as follows from the law of cosines of Equation 1:

$$c^2 = a^2 + b^2 - 2ab * \cos \delta \quad \text{Equation 1}$$

$$1.68^2 = D^2 + D^2 - 2D^2 * \cos\delta = 2D^2 * (1-\cos\delta), \text{ and}$$

$$D = SQR(1.68^2/(2*(1-\cos\delta))) \quad \text{Equation 2}$$

This procedure is performed on each ball and a least squared fit of the flight path is performed to improve system accuracy. Each ball image is now defined as having X, Y, and Z coordinates.

Figure 9:
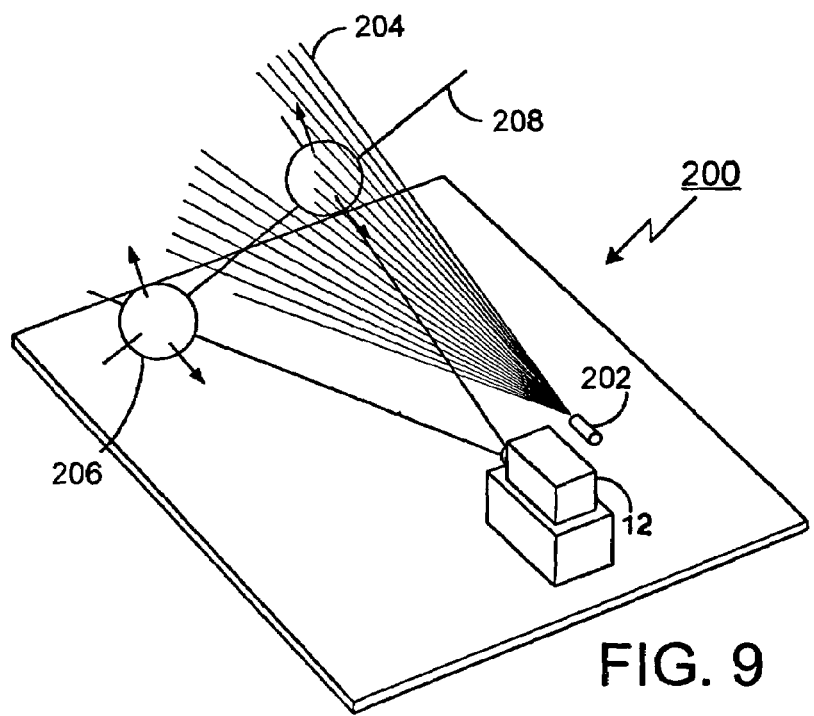
FIG. 9 is an illustration of a flight parameter measurement system of the exemplary embodiment using a structured light source or strobe light.

Single Camera with Structured Light Source. The exemplary embodiment of the present invention uses a single camera that takes two or more high-resolution images of the ball in flight and computes the true 3D flight characteristics. As illustrated in FIG. 9, a system of an alternate embodiment may also have a structured light source 202, such as a laser plane 204 or array of laser dots that is spatially calibrated to intersect with the field of view of a single camera 152. The system captures multiple images of the ball 206 during its flight, with one or more images taken while the ball is illuminated by the structured light source 202. Assuming the camera system 152 is calibrated to world coordinates, the system 152 computes a 3D vector for a line from the camera 152 which intersects the ball 206 at the point of illumination by the structured light source 202. Since the position and directional orientation of the light source relative to the camera 152 is known, the 3D intersection on the circumference of the ball of the line from the camera 152 and the light source 202 is computed using standard triangulation techniques. The laser source may also be used for illumination for triggering and initiation of ball tracking.

Given the 3D position of a point on the surface of the ball 206, and the known diameter of the ball, the location of the center of the ball must lay along the sight line 162 from the camera. The range to the center of the ball from the camera 152 also is calculated. Using this method, an accurate depth measurement from the camera 152 to the ball 206 is determined in order to calculate the trajectory of the ball 206 in three dimensions. This enhances the accuracy of the calculation of golf ball flight characteristics and enables launch azimuth to be determined as well.

If the structured light source 202 is an array of points, or has multiple planes, it becomes difficult to determine which light beam or plane the ball is intersecting. To resolve this problem a rough range to each ball 206 is computed by looking at the diameter of each ball, knowing the actual ball diameter and using the camera model to compute a range. By using this range envelope, and selecting the proper spacing and geometry for the structured light source, a single solution is computed. If the structured light source 202 is a wide angle light, the boundary between the light and the shadow regions on the ball 206 is used similarly to a laser plane. A 3D point on the surface of the ball 206 is calculated by triangulation, and the range to the center of the ball 206 from the camera 152 is calculated as described in the preceding paragraph.

6. Calculating the Velocity Vector

The size of the ball in each image, the position of the ball in each image, and the calibration information is used to determine a 3D position of the ball as discussed above. The 3D positions of at least two balls in real-world space and the time stamps associated with each image then are used to calculate a velocity vector, that is, the speed and direction of the ball.

The 3D positions of imaged balls B1, B2 at two different time stamps imply the trajectory T of the ball, as shown in FIG. 11A. The trajectory T has an elevation and an azimuth. The elevation angle EL is a rotation about the Z axis, as illustrated in FIG. 11B, and is determined from the change in vertical positions of the ball images B1, B2. The azimuth angle AZ, as illustrated in FIG. 11C, is the drift of the ball away from or towards the camera. Thus, the azimuth angle is a rotation about the Y axis. The elevation and azimuth angles are necessary for calculating the spin of a ball.

7. Glint Removal

Based on the type of illumination used, or ambient lighting conditions, spectral reflections or glints may be present in the image. These glints typically form on the surface of the ball facing the camera. Glints are always bright in nature, generally much brighter than the surrounding pixels. Glints may or may not change position as the ball rotates. Since correlation is a pixel by pixel matching of two images, global intensity differences due to illumination differences, or differences in the amount of light reflected, or surface features that do not move with the rotation of the ball create noise in the system. Therefore, prior to correlation, each ball image is prepared by performing glint removal and lighting normalization. A simple threshold against a local average, or a statistical look at a local group of pixels, is used to detect and remove glint pixels from the image prior to all other processing. The glint pixels are replaced with pixels based upon local averages.

8. Lighting Normalization

Compensation for non-uniform illumination or multiple light sources must be accomplished for proper ball correlation. For grayscale correlation on a pixel by pixel basis, the pixel intensities must match as close as possible. Because the images are captured at different spatial positions and under differing ambient lighting conditions, the illumination varies over the visible surface of the ball. Under uniform lighting conditions, concentric rings of increasing diameters around the center of the ball have illumination drop off as the curved surface of the ball angles away from the camera and light source. Additionally, each concentric ring has a constant average illumination as the ring is traced around the entire diameter. Thus, each concentric ring of the same diameter in each ball image should also exhibit the same average grayscale intensity.

FIG. 12 illustrates a preferred method for normalizing the ball images 250. The actual pixel brightness average is generated for many radial bands 252, 254, 256. Each radial band 252, 254, 256 a width "w" of a common value. The lengths $L_1$, $L_2$ of the bands vary in such a way to ensure that all bands have a similar or equal number of pixels 172. The number of bands may be chosen according to a desired uniformity of pixel brightness of the image. The averages are used to adjust the pixel values by a percentage such that the "normalized" band has the desired average, i.e., a desired average pixel brightness, in the vicinity of a pixel, and on the entire ball. For each radial band, any regions that exhibit a large change in intensity are scaled to make the profile of each ring uniform.

9. Rotation, Scaling, and Correlation

A key feature of the method of this patent is in determining the spin rate and axis for a sequence of 2D images of a golf ball with no marks or non-precision marks. The method looks at consecutive images of a ball in flight and uses mathematical transformations and correlation to track the movement/rotation of natural surface features, dimples, man made marks or blemishes. The method does not require any precise markings to be placed on the ball and will produce reliable results even if there are no man made marks on the ball other than natural surface features and blemishes. The model takes into account camera perspective and transforms the rotation into a world coordinate spin axis and spin rate.

As illustrated in FIG. 10, certain assumptions can be made about the behavior of the rotating ball 206 after being struck by a golf club. First, golf balls have negligible rifle spin which is defined as rotation about an axis 208 which is parallel to the direction of flight. Secondly, a spinning golf ball behaves gyroscopically having a fixed spin axis 212 after being struck by the club head. With these assumptions, it is known that the spin axis 212 must lay in a plane 210 that is orthogonal to the direction of flight, or trajectory T. Further, the spin axis 212 must pass through the center of the ball 206 and does not change orientation significantly after impact.

a. Frame of Reference

A basic frame of reference is defined herein for discussion. For the preferred embodiment, proper selection of the position of the camera or cameras can minimize the degree of distortion and increase spin resolution. For the maximum resolution, the camera or cameras should have a view that is as close as possible to parallel to the spin axis of the projectile. If the spin axis is pointing directly at the camera then most of the rotation will be about the center of the 2D image. This increases the number of correlation pixels and maximizes the ability to correlate more distant balls since points on the surface will not rotate out of the field of view. For purposes of this discussion assume the following: Y axis is in image plane pointing up; X axis is in image plane pointing right; Z normal to image plane pointing at the viewer; and rotation order is around X then around Y then around Z.

The following equations are used to rotate 3D points, where Cos 1 and Sin 1, Cos 2 and Sin 2, Cos 3 and Sin 3 are the rotation angles around X, Y and Z respectively:

Rotate points around X:

$$X1 = X \qquad \text{Equation 3}$$

$$Y1 = Y*\text{Cos } 1 - Z*\text{Sin } 1 \qquad \text{Equation 4}$$

$$Z1 = Z*\text{Cos } 1 + Y*\text{Sin } 1 \qquad \text{Equation 5}$$

Rotate points around Y:

$$X1 = X*\text{Cos } 2 + Z*\text{Sin } 2 \qquad \text{Equation 6}$$

$$Y1 = Y \qquad \text{Equation 7}$$

$$Z1 = Z*\text{Cos } 2 - X*\text{Sin } 2 \qquad \text{Equation 8}$$

[Rotate points around Z:

$$X1 = X*\text{Cos } 3 + Y*\text{Sin } 3 \qquad \text{Equation 9}$$

$$Y1 = Y*\text{Cos } 3 - X*\text{Sin } 3 \qquad \text{Equation 10}$$

$$Z1 = Z \qquad \text{Equation 11}$$

b. Exemplary Method for Determining Spin Axis

The method of the exemplary embodiment for determining the spin axis an rotation of a ball about that axis requires selection of a reference ball image B1 and a target ball image B2, as shown in FIG. 13. Each of these images has information associated with it including the angle of the azimuth, the angle of elevation, the center of the ball and diameter of the ball described above. In addition glint has been removed from the images, and the images have been lighting normalized.

FIG. 18 is a flow diagram of a preferred method for determining the spin axis and rotation speed of a ball about the spin axis. In a first step 300, a canonical view of the reference ball B1 is determined. A "canonical" view is used herein to describe the simplest or most symmetrical view to which all of the ball images can be reduced in order to map every image in a one-to-one manner to another image. In a second step 301, the rotation envelopes or ranges are determined for the X, Y and Z axes, as well as the incremental steps ranges i, j, and k for each rotation. The spin axis of canonical image B1, which lies in the XY canonical plane, is rotated in step 302, and then rotated on the canonical Z axis in step 304. The canonical image B1 is then rotated to the X,Y,Z coordinates of a target ball image B2, in step 304. The resulting reference ball image B1 is scaled to ball image B2, in step 305. In step 306, the resulting reference ball image B1 is correlated to target image ball B2. The score of the correlation is compared to a previous correlation score in step 307. If the score is improved, that is, a better correlation result, then the rotation X(i), Y(j), Z(k) is stored. After all of the increments within the range have been tried, as determined in step 309, the next incremental values of rotation are applied to the reference ball image B1. The steps of rotation, scaling, and correlating are repeated in a stepwise refinement manner, in step 311, until a desired smallest incremental range of rotations is applied to ensure a best correlation.

c. Converting a Reference Ball Image B1 to a Canonical View

Since the correlation is performed in the 2D-image plane the reference ball image B1 must be converted from the 3D world coordinate system to the 2D-image plane. This is accomplished using the 3D world vector that originates from the camera and passes through the center of each ball. For each vector, the azimuth and elevation of that vector relative to the nominal spin axis is computed and used as an offset for the 2D spin axis search, where nominal spin axis is the axis parallel to the earth tangent plane and orthogonal to the direction of flight. FIG. 13 illustrates canonical camera views of the ball images B1 and B2 as seen by hypothetical cameras "c1" and "c2" that have been aligned from the imaging position to positions in line with the spin axes, $Z_{c1}$ and $Z_{c2}$. FIG. 14A illustrate a front view of the canonical image B1, where the trajectory $T_c$ lies along the X axis of the canonical view. FIG. 14B is a side view of the canonical ball image B1 of FIG. 14A. In FIG. 14B, the spin axis 212 is shown at an hypothetical angle.

d. Determining Rotation Ranges and Increments

Determining rotation ranges and increments, Step 301 of FIG. 18, significantly reduces the number of calculations required for using correlation to find the spin. Certain assumptions about the spin axis 212 are made. It is known that balls, such as golf balls, have negligible, or no, rifle spin, and that golf balls are gyroscopic in nature having a fixed spin axis 212 once they leave the club head. Additionally, since the club face is angled upward for impacting the ball 206, the spin imparted to the ball by the club face will always be backspin for a normal golf shot. With these assumptions, the axis of spin 212 is estimated to a portion of plane 210, as shown in FIG. 13 that is orthogonal to the direction of flight 208. In addition, it is assumed that the spin axis goes through the center of the ball and does not move substantially after impact. The range of possible spin rates is further reduced by empirically determining spin rate versus shot speed and launch angle, and using this data to improve the estimate of the axis and the amount of rotation search range.

e. Rotating, Scaling, Translating and Correlating the Grayscale Image

Correlation is a common two-dimensional image processing technique to find a best spatial match between two images by making a series of successive comparisons. The images are incrementally translated, rotated, scaled, and differenced (pixel by pixel) by a computer until a spatial orientation with the minimum difference is detected. To maximize system resolution, as many ball images as possible should be captured during the initial flight of the ball. This helps to reduce the chance of false correlation and improve speed when correlating more distant balls due a better estimate of a spin range. After an approximation is developed, correlation is performed between more distant balls to increase resolution. A least squares fit or averaging is used where appropriate to utilize all available information and achieve the highest precision measurement as possible.

To correlate two ball images captured by the camera at different points in the trajectory, the first ball image is mathematically transformed to create a new image of the ball as it would appear had the camera had imaged it at the same location as the second ball image. This is described above as a "canonical view", step 300 of FIG. 18. Where Rx is defined as a rotation about the X axis, Ry is defined as a rotation about the Y axis, and Rz is defined as a rotation about the Z axis, the canonical view of the reference ball image B1 is determined by a first set of rotations as follows: Rx(−X1); Ry(−[y1+AZ]; and Rz(−EL)], where "AZ" and "EL" represent the azimuth angle and elevation angle, respectively.

Once the image is in a canonical form, a trial spin axis is selected, as illustrated in FIG. 15A, where the ideal selection aligns the spin axis with the line of sight to the camera. FIG. 15B illustrates the side view wherein the spin is parallel to the line of sight. FIGS. 16A and 16B illustrate a trial rotation of the sphere about that spin axis $Z_c$ in 3D space. This second set of trial rotations, steps 302 and 303 of FIG. 18, are described as follows: Rx(Xi) in an example range of −20<Xi<20; Ry(Yj) in an example range of −10<Yj<10; and Rz(Zk) in an example range of −20<Zk<0.

The image then is mapped back to 2D image space as it would appear to the camera at the extrapolated position corresponding to the second image of B2, as illustrated in FIGS. 17A and 17B. This third set of rotations, step 304 of FIG. 18, is described as follows: Rx(X2); Ry([Y2+AZ]; and Rz(EL)], where "AZ" and "EL" represent the azimuth angle and elevation angle, respectively.

After the transformation, standard 2D correlation is performed directly between the grayscale images of the rotated reference image B1 and the target image B2. This process of selecting a trial spin axis, performing a trial rotation in 3D space and mapping the image back into 2D space for correlation is repeated until the minimum difference correlation is found.

Although the rotation sets are described above as separate steps, it should be appreciated, as known in the art, that 3D rotation may be accomplished by creating a "rotation matrix" for each step, and then multiplying the matrices into a single "combined" rotation, which has the coefficients used for rotating pixels.

f. Converting Correlation Results to Real World Coordinates

Once the spin is determined from correlation, the rotation axis and magnitude are converted to the line of flight, and then the line of flight is converted to world coordinates. These rotations are easily performed by using the equations 3-11. Since the temporal information about the shot is also known the spin magnitude can be converted to spin rate is any desired units.

g. Additional Correlation Techniques and Dimple Tracking

Additional techniques exist that may be used in conjunction with or independently to grayscale correlation. Logos or other types of high contrast marks on the ball are used to increase correlation accuracy. These pixels are much darker than the neighboring pixels and can be separated from dark pixels caused by the shadow of a dimple. A simple threshold against a local average, or a statistical look at a local group of pixels, is used to detect and label logo pixels. This way they can be processed as a special case, or given more weight than other surface features used during correlation. An advantage of using logos exclusively is that the tracking process can be made contingent on finding a specific logo on the ball. Darker pixels potentially representing a logo are compared to a known logo pattern in order to detect a match. The logo pattern is mathematically transformed as previously described to match the position of the potential logo on the ball before the correlation can be performed. If a logo cannot be located, the tracking process is suspended or defaults to use the grayscale correlation process previously described.

Detecting the center of each golf ball dimple is another method that may be combined with or used separately from grayscale correlation. Dimples are 3D in nature and create shadows that are dark and light in appearance as their location on the surface of the ball moves towards the edge of the image. A series of filters is used corresponding to various dimple sizes and shadow patterns to locate the center of the dimples. The filters are used to locate characteristic shadow patterns of a dimple at various distances from the center of the ball. The filters adjust for ball diameter, variations in dimple size and elliptical distortion as the edge of the ball image is approached. The filters identify dark to light transition areas in the image characteristic of dimples as they are applied outward from the center of the ball along a radial line. For the region that directly faces the camera the filter will extract dark circles with lighter centers characteristic of a dimple facing the light source. Once the location of as many dimples as possible is determined, the mathematical centers are correlated. The detection accuracy of dimples diminishes as the detection process moves from the center of the ball outward. Therefore, greater weights are placed on correlations involving dimples closest to the center of the ball measured radially.

The flight parameter measurement system of this invention is much easier to use than prior art systems because it does not require manual adjustment of focus, exposure, calibration or leveling prior to each new measurement. Instead, the camera focus is fixed so that no on site adjustment is required, and the exposure is adjusted automatically. The system is completely calibrated in the factory on manufacture, and the camera is self-leveling or self-aligning based on a comparison of each new camera position with the original factory alignment.

The system of this invention is able to track a ball without relying on marks specially applied to the ball. All components of the system are mounted in one portable and compact enclosure, without requiring a separate camera, monitor or keyboard. The system will work for right or left handed golfers without adjustment. Triggering of the image acquisition is accomplished accurately by using a microphone and a radar horn together to detect both the sound of a ball being hit and the resultant movement of the ball. Audio output of flight parameter data computed by the system is convenient for the golfer and golf professional, since they do not have to look at a screen in order to see the results, but can carrying on practicing or playing. The audio output may be associated with earphones for the golf professional or coach, who can then interpret the data and give instructions to the player.

Although an exemplary embodiment of the invention has been described above by way of example only, it will be understood by those skilled in the field that modifications may be made to the disclosed embodiment without departing from the scope of the invention.

We claim:

1. A ball flight parameter measurement system, comprising:
   a sensor adapted to capture a plurality of images of the ball in flight;
   an alignment device is adapted to generate a misalignment signal based on the orientation of the alignment device relative to earth tangential;
   an output device; and
   a processor coupled to the alignment device, the sensor and the output device, operating the steps of:
   receiving the plurality of images from the sensor;
   receiving the misalignment signal from the electronic alignment device;
   determining an alignment correction factor based on the misalignment signal to compensate for any difference between the current orientation of the sensor and a previously calibrated orientation;
   calculating at least one ball flight parameter based on the plurality of images and the alignment correction factor; and
   outputting the ball flight parameter on the output device.

2. The ball flight parameter measurement system according to claim 1, wherein the at least one flight parameter is launch elevation.

3. The ball flight parameter measurement system according to claim 1, wherein the at least one flight parameter is spin axis.

4. The ball flight parameter measurement system according to claim 1, wherein the alignment device is an accelerometer, an inclinometer, or an electronic level.

5. The ball flight parameter measurement system according to claim 1, further comprising:
   an audio circuit;
   the output device comprises a speaker; and
   the processor further operates the step of converting the flight information to a digital voice signal, and
   the audio circuit outputs the digital voice signal on the speaker.

* * * * *